June 2, 1931.  H. KRAUSE  1,808,045
CLIP STRUCTURE FOR FOUNTAIN PEN CAPS, PENCILS, AND THE LIKE
Filed Dec. 5, 1929
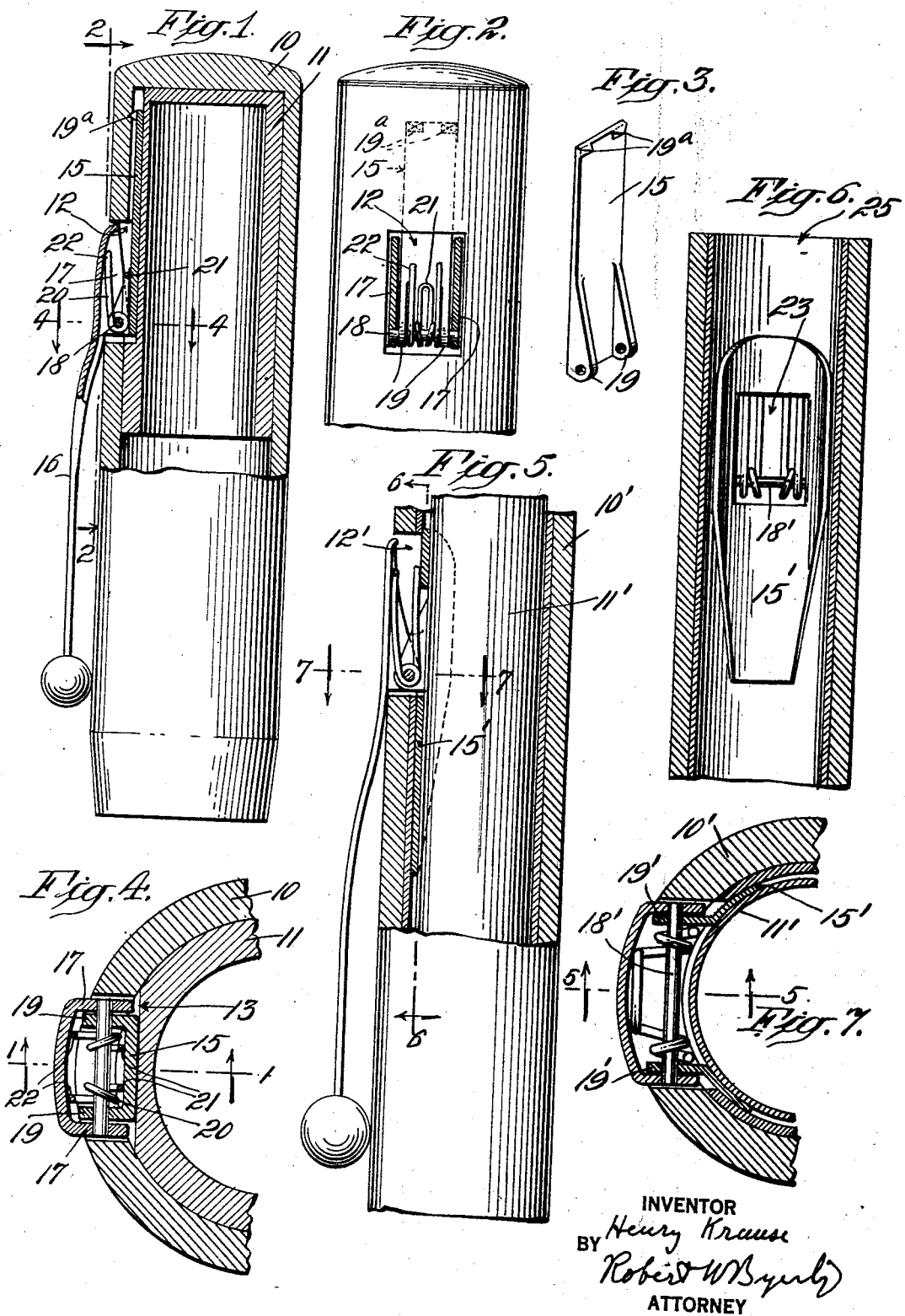
INVENTOR
BY Henry Krause
Robert W Byrly
ATTORNEY Patented June 2, 1931

1,808,045

UNITED STATES PATENT OFFICE

HENRY KRAUSE, OF NEW YORK, N. Y.

CLIP STRUCTURE FOR FOUNTAIN-PEN CAPS, PENCILS AND THE LIKE

Application filed December 5, 1929. Serial No. 411,747.

The present invention relates to clip structures and more particularly for fountain pen caps, pencils and the like.

An object of the invention is to provide an inexpensive clip structure adapted to be readily and quickly applied to a tubular member.

Another object of the invention is to provide a simple and inexpensive clip readily applicable to a slotted tubular member which when applied securely positions the clip in operative relation to the tubular member.

Another object of the invention is to improve the operation of clips for pens, pencils and the like when applied thereto, and to minimize the wear thereon.

Another object of the invention is to provide a clip member mounted upon an anchor bar having an area greater than the area of a slot in the clip member and adapted to be inserted through said slot to anchor said clip in position.

Other and further objects of the invention will be obvious upon an understanding of the illustrative embodiment or indicated in the appended claims, and various advantages not referred to herein will occur to one skilled in the art upon application of the invention in practice.

The nature of the invention and its advantages may best be understood from a detailed description of the clip structures illustrating a preferred embodiment of the invention and shown in the accompanying drawings, in which Figs. 1 to 4 inclusive show such a structure applied to a conventional fountain-pen cap, while Figs. 5 to 7 inclusive show a modified clip structure applied to a pencil barrel:

Fig. 1 is a side view of a fountain-pen cap, partly sectioned on the line 1—1 of Fig. 4 to show the application of the clip structure;

Fig. 2 is a fragmentary side view of the cap shown in Fig. 1 taken at an angle of 90° from Fig. 1 and showing the clip sectioned on the line 2—2 of Fig. 1;

Fig. 3 is a perspective view of the anchor bar of the clip structure shown in Fig. 1;

Fig. 4 is an enlarged transverse section taken on the line 4—4 of Fig. 1;

Fig. 5 is a fragmentary side view of a pencil barrel, partly in longitudinal section to show the application of a modified clip structure;

Fig. 6 is a longitudinal section taken on the line 6—6 of Fig. 5 and omitting the body of the pencil; and Fig. 7 is an enlarged transverse section taken on the line 7—7 of Fig. 5, omitting the parts within the body of the pencil.

Each of the clip structures shown in the drawings includes a clip and a mounting member pivoted together and extending in the same general direction, so that the structure may easily be applied to a slotted tubular member to place the mounting member inside and the clip outside. Each clip structure also includes a spring reacting between the clip and the mounting member to press one end of the clip out so as to urge its other end against the tubular member.

Figs. 1 to 5 illustrate a fountain-pen cap which includes an outer sleeve 10 closed at one end and an inner sleeve or plug 11 fitting tightly within the outer sleeve. The outer sleeve 10 contains a longitudinal slot 12 in its side wall, and the inner sleeve may have a flattened surface 13 under and beyond the slot 12.

The clip structure for the pen cap includes a mounting member or anchor bar 15 extending longitudinally of the fountain-pen cap and held between the outer sleeve 10 and the inner sleeve 11 and underlying the slot 12, and a clip 16 lying outside the outer sleeve 10 and attached to the anchor bar 15 by a pivot 18 in the slot 12. This pivot passes through trunnions provided by inturned side walls 17 formed on the clip 16 near its upper end and projecting into the slot 12 from the outside, and flanges 19 formed on the anchor bar 15 and projecting into the slot 12 from the inside. The anchor bar may be provided with sharp projections 19a which enter the inner surface of the outer sleeve 10 and hold the anchor bar still more firmly in position. The anchor bar is slightly narrower than the slot 12.

The clip structure also includes a spring 20 located in the slot 12 and reacting between the anchor bar and the clip to urge the upper end of the clip outward so as to hold its lower end against the sleeve 10. In the form shown, the spring 20 is a wire torsion spring wound about the pivot 18 and having a projecting bight 21 which presses against the inner surface of the clip near its inner end, and projecting ends 22 which press against the outer surface of the anchor bar.

The clip structure is applied to the outer sleeve 10 of the fountain-pen cap, before the inner sleeve or the plug 12 is inserted, by passing the anchor bar 15 through the slot 11. This can easily be done while both the clip 16 and the anchor bar 15 extend longitudinally of the cap. The plug 12 is then inserted to lock the anchor bar into position, and thus hold the clip firmly in operative relation to the fountain-pen cap.

Figs. 5 to 7 show parts of a propelling pencil which has an open-ended barrel or an outer sleeve 10' and an inner sleeve 11' which is the body of the pencil and contains the usual propelling mechanism (not shown). The barrel or outer sleeve 10 contains a longitudinal slot 12' corresponding to that of the outer sleeve of the pen cap already described.

The clip structure shown for the pencil differs from that already described only in the conformation of the anchor bar 15' which, in this instance, is wider than the slot 12' in the pencil barrel 10' and is transversely curved to fit the curvature of the barrel. The anchor bar 15' contains an intermediate opening 23, the material of which is struck up to form two flanges 19' through which the pivot 18' extends.

The modified clip structure is applied to the pencil barrel 10', by passing the clip into the barrel through its open upper end 25 and then out through the slot 12' so as to bring the clip outside the barrel while the anchor bar 15' remains inside and underlies the slot. The pencil body 11' is then inserted and serves, like the plug 11 of the pen cap, to lock the anchor bar in position and to hold the clip firmly in operative relation to the pencil barrel.

As various changes may be made in the form, construction and arrangement of the parts without departing from the spirit of the invention, it is to be understood that all matter herein is to be interpreted as illustrative and not in a limiting sense.

What I claim is:

1. The combination with a tubular member containing a longitudinal slot, of a clip structure comprising a clip and an anchor bar extending in the same general direction and pivoted together and of greater width and area than the width and area of the slot, one of them being adapted to be passed through the slot in the tubular member so as to place the clip outside the tubular member and the anchor bar inside the tubular member.

2. The combination with a tubular member containing a longitudinal slot, of a clip and a mounting member each extending lengthwise of the tubular member and lying respectively outside and inside the tubular member, and a pivot bar shorter than the width of the slot located within the slot and connecting the clip and mounting member.

3. The combination with a tubular member having inner and outer sleeves of which the latter contains a longitudinal slot, of an anchor bar located between said sleeves and underlying said slot, a clip, and a pivot bar located entirely within the slot and connecting the anchor bar and clip.

4. The combination with a tubular member containing a longitudinal slot, of an anchor bar extending lengthwise of the tubular member within the tubular member and having a projection entering the slot from the inside, a clip having a projection entering the slot from the outside, and a pivot lying in the slot and connecting said projections.

5. The combination with a tubular member containing a longitudinal slot, of an anchor bar extending longitudinally of the tubular member inside the tubular member and having trunnions projecting into said slot from the inside, a clip lying outside the tubular member and having trunnions projecting into said slot from the outside, a pivot lying in the slot and extending from said trunnions, and a spring tending to turn the clip about said pivot.

6. The combination with a tubular member having inner and outer sleeves of which the outer contains an aperture, of an anchor bar extending longitudinally of said tubular member between said sleeves and transversely curved to fit the curvature of the sleeves, and a clip pivotally attached to said anchor bar.

7. The combination with a slotted tubular member, of a spring-actuated clip structure attachable and detachable as a unit with respect to said tubular member and comprising pivotally connected clip and mounting member, and a spring reacting between the clip and the mounting member.

8. The combination with a tubular member containing a longitudinal slot, of a mounting member within the tubular member underlying said slot, a clip pivoted to said mounting member, and a spring located in the slot and reacting between the mounting member and the clip to urge one end of the clip outwardly so as to press its other end against the tubular member.

9. The combination with a tubular member containing a longitudinal slot, of a mounting member inside the tubular member, a clip outside the tubular member and connected thereto by a pivot located in the slot of the tubular member, and a spring reacting between the clip and the mounting member to urge one end of the clip outwardly so as to press its other end against the tubular member.

10. The combination with a tubular member containing a longitudinal slot, of an anchor bar extending longitudinally of the tubular member and lying inside the tubular member, a clip pivotally connected to said anchor bar, and a spring reacting between said clip and anchor bar to urge one end of the clip outwardly so as to press its other end against the tubular member.

11. A clip structure for slotted tubular members, comprising a clip, a mounting member, a pivot connecting the clip and the mounting member, and a torsion spring wound about said pivot and having projecting ends reacting against the clip and the mounting member and tending to cause relative turning thereof about said pivot.

12. The combination with a tubular member containing a longitudinal slot, of a clip having a projection entering said slot from the outside, a mounting member having a projection bent upwardly from the contour thereof and entering said slot from the inside, and a pivot connecting said projections.

13. The combination with a tubular member containing a longitudinal slot, of a clip having a projection entering said slot from the outside, a mounting member having a projection entering said slot from the inside, a pivot connecting said projections, and a spring tending to turn the clip about said pivot.

14. The combination with a tubular member of a mounting member secured to said tubular member, a pivoting member secured to said mounting member, a clip mounted on said pivoting member and a torsion spring wound about said pivoting member and urging the clip to turn about said pivot.

15. The combination with a tubular member having a slot thereon, of a clip having projections entering said slot from the outside, a mounting member having the contour of its open surface adapted to conform to the contour of the inside of the tubular member and having projections struck from the central portion thereof to enter said slot from the inside of said tubular member, and a pivoting member connecting the projections of said clip and the projections of said mounting member.

16. The combination of a tubular member having a slot therein, of a clip having projecting flanges extending from the sides thereof entering said slot from the outside, a sheet metal mounting member on the inside of said tubular member having projections entering said slot from the inside and a pivoting member connecting the projections of said clip and the projections of said mounting member to pivotally mount said clip within said slot.

17. The combination of a tubular member containing a longitudinal slot, of a clip having projections entering said slot from the outside, a mounting member having an aperture therein and projections bent upwardly from the sides of said aperture entering said slot from the inside, a pivot connecting said projections, resilient means operative upon one end of said clip to force the other end into contact with said tubular member, and means within said tubular member for holding said mounting member within the inner surface of said tubular member.

In testimony whereof I have hereunto set my hand.

HENRY KRAUSE.